United States Patent
Acosta Jimenez et al.

(10) Patent No.: US 9,939,837 B2
(45) Date of Patent: Apr. 10, 2018

(54) METHOD FOR GENERATING PIECEWISE-AFFINE MULTIVARIABLE FUNCTIONS WITH ON-LINE COMPUTATION OF THE SEARCH TREE AND DEVICE FOR IMPLEMENTING SAME

(71) Applicants: Universidad De Sevilla, Seville (ES); Consejo Superior De Investigaciones Cientificas, Madrid (ES)

(72) Inventors: Antonio Jose Acosta Jimenez, Seville (ES); Iluminada Baturone Castillo, Seville (ES); Javier Castro Ramirez, Seville (ES); Carlos Jesus Jimenez Fernandez, Seville (ES); Piedad Brox Jimenez, Seville (ES); Macarena Cristina Martinez Rodriguez, Seville (ES)

(73) Assignees: Universidad de Sevilla (ES); Consejo Superior de Investigaciones Cientficas (ES)

( * ) Notice: Subject to any disclaimer, the term of this patent is extended or adjusted under 35 U.S.C. 154(b) by 586 days.

(21) Appl. No.: 14/405,552

(22) PCT Filed: Jun. 4, 2013

(86) PCT No.: PCT/ES2013/000134
§ 371 (c)(1),
(2) Date: Mar. 3, 2015

(87) PCT Pub. No.: WO2013/182717
PCT Pub. Date: Dec. 12, 2013

(65) Prior Publication Data
US 2015/0301555 A1    Oct. 22, 2015

(30) Foreign Application Priority Data
Jun. 4, 2012   (ES) .................................. 201200608

(51) Int. Cl.
G06F 1/02 (2006.01)
G06F 17/17 (2006.01)
(Continued)

(52) U.S. Cl.
CPC ............... *G06F 1/02* (2013.01); *G05B 15/02* (2013.01); *G06F 17/175* (2013.01);
(Continued)

(58) Field of Classification Search
CPC .... G06F 1/02; G06F 17/175; G06F 17/30864; G06F 17/30961; G05B 15/02; G06N 99/005
(Continued)

(56) References Cited

U.S. PATENT DOCUMENTS 6,701,014 B1 * 3/2004 Syeda-Mahmood G06F 17/30256 382/199
2011/0260998 A1 * 10/2011 Ludwig ................. G06F 3/0414 345/173

OTHER PUBLICATIONS

Baturone, Digital Implementation of Hierarchical Piecewise-Affine Controllers, symposium, 2011, p. 1497-1502, IEEE.
(Continued)

*Primary Examiner* — Miranda Huang
*Assistant Examiner* — Sivalingam Sivanesan
(74) *Attorney, Agent, or Firm* — Hayes Soloway PC (57) ABSTRACT

Method for generating piecewise-affine multivariate functions, wherein the online computation of the search tree is performed in order to locate the input value in the polytopes of the partition, and the subsequent generation of the corresponding affine function. It also proposes a configurable and programmable device for generating piecewise-affine multivariate functions composed of an architecture with four functional blocks namely: a control unit block (1), a tree memory block, a parameter memory block and an arithmetic
(Continued)

unit block; and it has at least three operating modes which can be selected using different values of a bus (config): writing of the tree memory, writing of the parameter memory and evaluating the affine function. It may include a fourth operating mode, which is the test mode.

15 Claims, 4 Drawing Sheets

(51) Int. Cl.
*G06N 99/00* (2010.01)
*G05B 15/02* (2006.01)
*G06F 17/30* (2006.01)

(52) U.S. Cl.
CPC .. *G06F 17/30864* (2013.01); *G06F 17/30961* (2013.01); *G06N 99/005* (2013.01)

(58) Field of Classification Search
USPC .......................................................... 700/40
See application file for complete search history.

(56) References Cited

OTHER PUBLICATIONS

Baturone, Design of Embedded DSP-Based Fuzzy Controllers for Autonomous Mobile Robots, IEEE Transactions on Industrial Electronics, Feb. 2008, p. 928-936, vol. 55, Issue 2, IEEE.

Baturone, Microelectronic Design of Fuzzy Logic-Based Systems, 2000, p. 1-336, CRC Press.

Echevarria, Digital Hardware Implementation of High Dimensional Fuzzy Systems, Applications of Fuzzy Sets Theory, 2007, p. 245-252, vol. 4578, Springer.

Martinez-Rodriguez, Design Methodology for FPGA Implementation of Lattice Piecewise-Affine Functions, Field-Programmable Technology (FPT) International Conference, 2011, p. 1-4, IEEE.

Johansen, Hardware Synthesis of Explicit Model Predictive Controllers, IEEE Transactions on Control Systems Technology, Jan. 2007, p. 191-197, vol. 15, Issue 1, IEEE.

Martinez-Rodriguez, Circuit Implementation of Piecewise-Affine Functions Based on Lattice Representation, 2011 20th European Conference on Circuit Theory and Design, Aug. 2011, p. 644-647, IEEE.

Oliveri, Circuit implementation of piece-wise athne functions based on a binary search tree, 2009 European Conference on Circuit Theory and Design, Aug. 2009, p. 145-148, IEEE.

Rovatti, Automatic Implementation of Piecewise-Linear Fuzzy Systems Addressing Memory-Performance Trade-Off, Fuzzy Hardware: Architectures and Applications, 1998, p. 159-179, Kluwer Academic Publishers, Norwell, MA.

Rovatti, High-speed DSP-based implementation of piecewise-affine and piecewise-quadratic fuzzy systems, Signal Processing, 2000, p. 951-963, vol. 80, Elsevier Science B.V.

Sanchez-Solano, FPGA Implementation of Embedded Fuzzy Controllers for Robotic Applications, IEEE Transactions on Industrial Electronics, Aug. 2007, p. 1937-1945, vol. 54, Issue 4, IEEE.

Storace, Digital architectures realizing piecewise-linear multivariate functions: Two FPGA implementations, International Journal of Circuit Theory and Applications, 2009, p. 1-15, vol. 39, Issue 1, John Wiley & Sons, Ltd.

Tondel, Evaluation of piecewise affine control via binary search tree, Automatica, May 2003, p. 945-950, vol. 39, Issue 5, Elsevier Science Ltd.

* cited by examiner

METHOD FOR GENERATING PIECEWISE-AFFINE MULTIVARIABLE FUNCTIONS WITH ON-LINE COMPUTATION OF THE SEARCH TREE AND DEVICE FOR IMPLEMENTING SAME

The present invention relates to a method and a device which allow the generation of piecewise-affine multivariate functions with online computation of the search tree. It is included in the scope of automatics and control, making it possible to implement non-linear signal processing and/or controllers for any plant whose control surface can be definable by piecewise-affine functions.

PRIOR ART

The need to implement piecewise-affine functions arises naturally in many engineering problems such as adaptive control, fuzzy control, the identification of dynamic non-linear systems or sensor networks. The realization of piecewise linear functions using VLSI circuits has many practical applications, mainly in the field of control systems embedded in real time or whenever it is not viable or convenient to resort to processors, microcontrollers or general purpose devices, such as for example the boards incorporating DSP (Digital Signal Processing) elements.

A piecewise-affine function (PWA), $f_{PWA}$: $D \rightarrow R$, defined on a compact domain $D \subset R^n$ verifies that:

$$f_{PWA}(x) = f_i^T x + g_i, x \in \Omega_i, i = 1, \ldots, N_P$$

wherein $f_i \in R^n$, $g_i \in R$ and $\Omega_i$ are $N_P$ polyhedral regions, called polytopes, which do not overlap and the joining thereof gives rise to D, i.e. they induce a polyhedral partition in the domain D; wherein each polytope is a closed region delimited by hyperplanes ($h_j^T x + k_j = 0$, wherein $h_j \in R^n$, $k_j \in R$); and wherein throughout the plane it is possible to distinguish $N_E$ hyperplanes which delimit the polytopes, wherein each hyperplane divides the domain in two parts, and the $f_{PWA}$ function is affine on each polytope, $\Omega_i$; so that the problem of locating the point has the objective of finding the index i so that $x \in \Omega_i$ to thus provide the affine function in that point.

Various works are known in the state of the art in the electronic implementation of piecewise-affine functions dependent on multiple inputs. Among the known inputs, analogue inputs are not sufficiently robust, so that in recent times digital implementations have been proposed, aimed at realizations on reconfigurable hardware such as FPGAs (Field Programmable Gate Arrays), especially interesting for the realization of prototypes or aimed at dedicated integrated circuit (ICs) realizations, also known as ASICs (Application Specific Integrated Circuits). In general, although the implementations on FPGAs are feasible, ASIC solutions on VLSI (Very Large Scale Integration) technologies provide better performance and are most suitable for the design of embedded systems.

The electronic implementation of PWA functions as well as other non-linear functions for fuzzy controllers is already known in the state of the art. The problem of performing PWA multivariate functions is resolved in the state of the art [1 and 2] by using a commercial DSP device. Other documents in the state of the art analyse how to include non-linear fuzzy controllers (in particular PWA) in embedded applications. In this respect, document [3] discloses how to implement the fuzzy controller as a bespoke IP module which accelerates the inference tasks of a general purpose processor. The publication in [4] discloses a design methodology based on CAD tools which allow the fast design of complex fuzzy controllers which are implemented in a fixed-point DSP. The two digital ASICs disclosed in [5] implement non-linear functions typical of fuzzy control. Finally, the FPGA solution disclosed in [6] is also aimed at the implementation of a fuzzy controller.

Likewise, different canonical forms have been studied for the implementation of PWA multivariate functions. The canonical representations perform a description of a PWA function using the fewest possible number of parameters. The choice of a certain canonical form is vital, especially in applications working with functions defined on a multidimensional domain or a domain with few dimensions but highly partitioned.

The canonical form called PieceWise-Affine Simplicial (PWAS) performs a partition of the input domain in regions called 'simplices'. In the state of the art, an architecture is proposed for the embodiment of integrated mixed signal circuits of PWAS functions. A digital ASIC is known that implements PWAS functions, and a design of a mixed integrated circuit is known which implements triple-input PWAS functions in 0.5 µm technology. More recently, several architectures have been presented for the realization of digital PWAS circuits. Among them we can highlight the architecture proposed in [7] of which two versions are described (one parallel and one serial) implemented on FPGAs. The PWAS implementations have two important limitations. The first is the "curse of dimensionality", consisting of the number of parameters necessary to define them rising exponentially with the number of domain dimensions. The second limitation of the PWAS is that it is not capable of generating any type of PWA function but just a subset of them. The reported microelectronic realizations further reduce this subset as they use a maximum number of partitions per dimensions which is not very high.

Another canonical form is that based on the 'lattice' representation disclosed in [8], which has been implemented on FPGAs using a design flow based on ISE tools and System Generator from Xilinx. A limitation of this canonical form is that it only allows the realization of continuous affine functions. Another solution consists of performing the implementation of a hierarchical architecture, wherein the PWA multivariate function is decomposed in modules, which implement cascade-connected PWA one-dimensional functions. This architecture has been explored for different case studies, being implemented on FPGAs in [9]. As occurs with the canonical PWAS form, this solution is not capable of generating any type of PWA function but just a subset of them.

The only canonical representation which makes it possible to implement any PWA function is the so-called PWA generic (PWAG). There are only two digital circuits proposed in the literature which implement PWAG functions [10, 11]. Both circuits use architectures aimed at exploring a binary search tree to resolve the problem of locating the point. The tree is constructed to minimise its depth (maximum distance between the tree root and leaves) and to obtain the greatest possible symmetry, using the process disclosed in [12]. [10] does not propose a specific architecture to implement PWAG functions, but it performs a direct hardware synthesis from a high-level description (C language) of the PWAG function which uses the algorithm based on the binary search tree. The hardware synthesis uses the PICO-NPA tool. Any modification of the PWA function which involves a change in the binary search tree makes it necessary to repeat the entire synthesis process to obtain a new digital circuit. In [11], the binary search tree is routed using a finite state machine. As occurs in [10], a modification of the tree implies a new HDL (Hardware Description Language) description which must again be programmed in the FPGA. This means that the FPGA must be taken out of its operating context to be reconfigured or that its operating environment must be considerably complicated to be able to be reconfigured 'in situ'.

REFERENCES

[1] R. Rovatti, A. Ferrari, M. Borgatti, "Automatic implementation of piecewise-linear fuzzy systems addressing memory-performance tradeoff," in Fuzzy hardware: architectures and applications, A. Kandel and G. Langholz, Eds. Norwell, Mass., USA: Kluwer Academic Publishers, 1998, pp. 159-179.

[2] R. Rovatti, C. Fantuzzi, S. Simani, "High-speed DSP-based implementation of piecewise-affine and piecewise-quadratic fuzzy systems," Signal Processing, Vol. 80, pp. 951-963, 2000.

[3] S. Sánchez-Solano, A. Cabrera, I. Baturone, F. J. Moreno-Velo, M. Brox, "FPGA implementation of embedded fuzzy controllers for robotic applications", IEEE Trans. on Industrial Electronics, Vol. 54 (4), pp. 1937-1945, August 2007

[4] I. Baturone, F. J. Moreno-Velo, V. Blanco, J. Ferruz, "Design of embedded DSP-based fuzzy controllers for autonomous robots", IEEE Trans. on Industrial Electronics, Vol. 55, pp. 928-936, February 2008,

[5] I. Baturone, A. Barriga, S. Sánchez Solano, C. J. Jiménez Fernández, D. R. López, "Microelectronic design of fuzzy logic-based systems", CRC Press, March 2000, ISBN: 0849300916.

[6] P. Echevarria, M. Martinez, J. Echanobe, I. of the Campo, J. Tarela, "Digital hardware implementation of high dimensional fuzzy systems," in Applications of Fuzzy Sets Theory, ser. Lecture Notes in Computer Science. Berlin: Springer, 2007, pp. 245-252.

[7] M. Storace, T. Poggi, "Digital architectures realizing piecewise-linear multi-variate functions: two FPGA implementations", Int. Journal of Circuit Theory and Applications, Vol. 39 (1), pp. 1-15, 2011.

[8] M. C. Martinez-Rodriguez, I. Baturone, P. Brox, "Design Methodology for FPGA Implementation of Lattice Piecewise-Affine Functions", in Proc. 2011 Int. Conf. on Field-Programmable Technology (FPT), New Delhi (India), 12-14 Dec., 2011, pp. 1-4. M. C. Martinez-Rodriguez, I. Baturone, P. Brox, "Circuit Implementation of Piecewise-Affine Functions Based on Lattice Representation", in Proceedings of the 2011 European Conference on Circuit Theory and Design (ECCTD), Linköping, Sweden, 29-31 Aug., 2011, pp. 644-647.

[9] I. Baturone, M. C. Martinez-Rodriguez, P. Brox, A. Gersnoviez, S. Sánchez-Solano "Digital implementation of hierarchical piecewise-affine controllers", in Proc. of the 21th IEEE International Symposium on Industrial Electronics (ISIE), Gdańsk, Poland, 27-30 June, 2011, pp. 1497-1502.

[10] T. Johansen, W. Jackson, R. Schreiber, and P. Tøndel, "Hardware synthesis of explicit model predictive controllers," IEEE Trans. on Control Systems Technology, Vol. 15 (1), pp. 191-197, January 2007.

[11] A. Oliveri, T. Poggi, M. Storace, "Circuit implementation of piecewise-affine functions based on a binary search tree", in Proc. European Conference on Circuit Theory and Design (ECCTD), Antalya (Turkey), 23-27 Aug., 2009, pp. 145-148.

[12] P. Tøndel, T. Johansen, and A. Bemporad, "Evaluation of piecewise-affine control via binary search tree," Automatica, Vol. 39 (5), pp. 945-950, May 2003.

EXPLANATION OF THE INVENTION

The present invention proposes a method for generating piecewise-affine multivariate functions, wherein the online computation of the search tree is performed in order to locate the input value in the polytopes of the partition, and the subsequent generation of the corresponding affine function and a device which makes it possible to realize said method.

The device for generating piecewise-affine multivariate functions of the present invention comprises an architecture for digital circuits which implements PWA functions in their generic form (PWAG). The architecture allows implementing any PWA function, including those which cannot be implemented by the solutions aimed at PWAS forms: "lattice" or hierarchical. The architecture of the present invention allows in situ configurability and programmability, it being possible to modify the search tree and the PWA function without the need for generating a new circuit. This process allows that with a single digital circuit it is possible to implement different PWA functions. Therefore, different industrial applications can be encompassed by suitably configuring and programming the circuit.

The invention makes reference to the electronic VLSI implementations of piecewise-affine functions (PWA) in its generic solution (PWAG). These circuits are immediately applicable in control circuits which can be resolved by Model Predictive Control (MPC). In the solutions existing in the state of the art of PWAG-type, the problem of locating the point within the polytope is resolved by the construction of the binary search tree external to the circuit (offline). In the present invention, the construction of the binary search tree is performed internally, i.e. online. To do this, it uses a diagram based on two digital memories. The first memory (tree memory) stores the possible states of the tree, whilst the second memory (parameter memory) stores the parameters that serve to compute the function using an arithmetic unit.

The parameter memory contains the coefficients and the offsets that the arithmetic unit uses to compute the affine functions associated to the polytopes and to the hyperplanes of the polyhedral partition. The tree memory stores the addresses of the parameter memory.

The main advantages of the present invention are the programmability, since the user can programme different partitions with different affine functions, and configurability, since the same circuit can resolve problems that require different numbers of inputs or search trees with different depth and structure. As it can be directly integrated in an Application Specific Integrated Circuit (ASIC), its area requirements, temporary features and consumption improve the offline programmable solutions by at least one order of magnitude. In said sense it can be considered a high-performance universal PWA generator.

DETAILED EXPLANATION OF EMBODIMENTS

Figure 1:
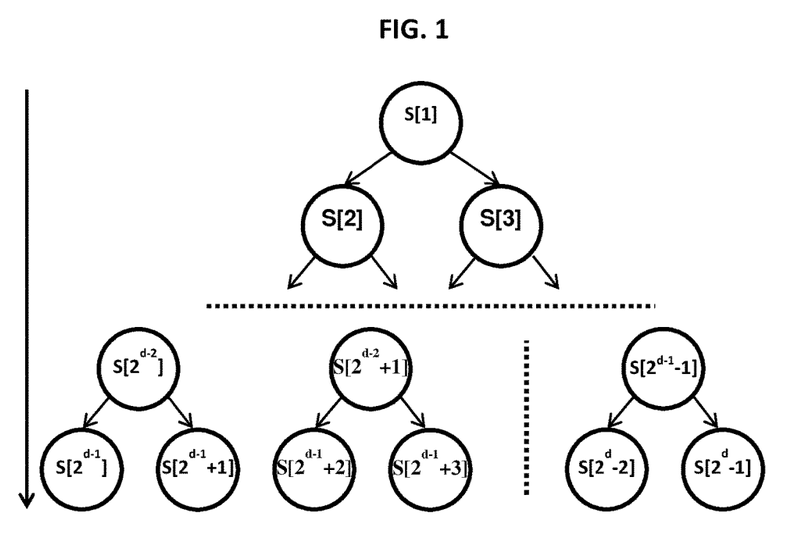
FIG. 1 shows the search tree with a depth d.
Figure 2:
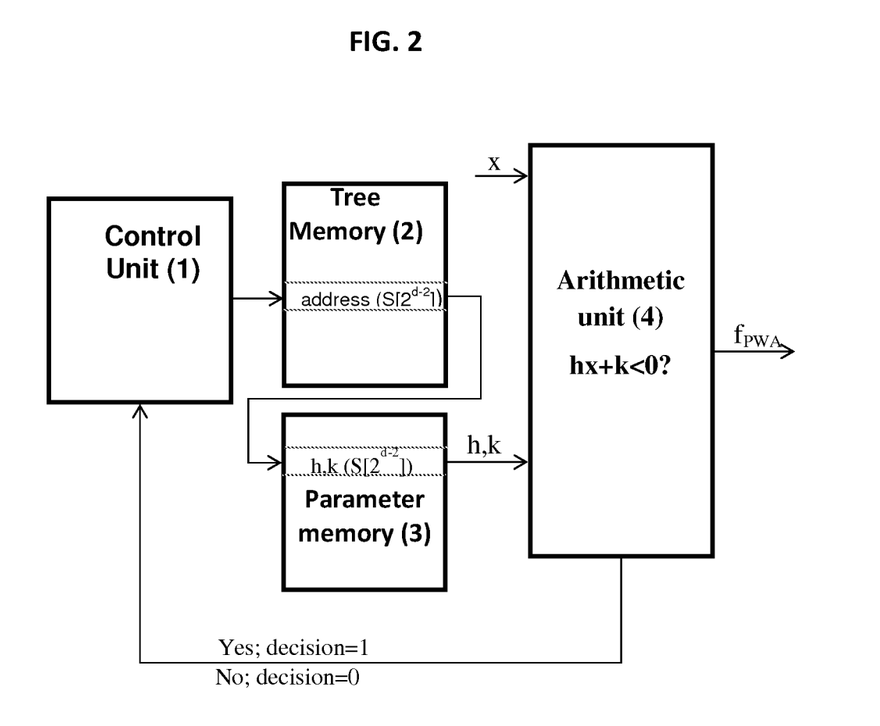
FIG. 2 shows the routing diagram of the binary tree with the device, showing the device architecture.

The present invention describes a method for generating piecewise-affine multivariate functions, wherein the online computation of the search tree is performed in order to locate the input value in the polytopes of the partition, and the subsequent generation of the corresponding affine function; and wherein a piecewise-affine function (PWA), $f_{PWA}$: $D \rightarrow R$, defined on a compact domain $D \subset R^n$ verifies that:

$$f_{PWA}(x) = f_i^T x + g_i, x \in \Omega_i, i = 1, \ldots, N_P \quad (1)$$

wherein $f_i \in R^n$, $g_i \in R$ and $\Omega_i$ are $N_P$ polyhedral regions, called polytopes, which do not overlap and the joining thereof gives rise to the domain D, i.e. they induce a polyhedral partition in the domain D; wherein each polytope is a closed region delimited by hyperplanes ($h_j^T x + k_j = 0$, wherein $h_j \in R^n$, $k_j \in R$); and wherein throughout the plane it is possible to distinguish $N_E$ hyperplanes which delimit the polytopes, wherein each hyperplane divides the domain in two parts, and the function $f_{PWA}$ is affine on each polytope, $\Omega_i$; so that the problem of locating the point has the objective of finding the index i so that $x \in \Omega_i$ to thus provide the affine function in that point; and wherein the resolution of this problem starts from the construction of a search tree and subsequently its exploration. The method is characterized in that the binary search tree is formed from a single root, which is a first state S[1] which branches into two states, which are a second state S[2] and a third state S[3] which, in turn and successively, branch into two states, so that for a depth of the tree d, the number of states is $2^d - 1$, the $2^{d-1}$ states of the deepest level being the leaves of the tree; and wherein the problem of locating the input value in the polytopes is equivalent to the iterative evaluation of affine functions whose parameters ($h_j$, $k_j$) are real values; and wherein it is possible to locate the polytope containing the input vector by successively performing the comparisons ($h_j^T x + k_j < 0$); and wherein the online search tree exploration is performed so that given a vector x, it starts from the first state S[1] checking if $h_1^T x + k_1 < 0$: if correct, it selects the branch that leads to the second state S[2], if this is not correct, it selects the one that leads to the third state S[3], repeating the process until a leaf is reached. In FIG. 1, the binary tree is observed. FIG. 2 represents the online search tree exploration using the device of the invention (illustrating the exploration by the state $S[2^{d-2}]$). This exploration is performed from the root to the leaves.

Another object of the present invention is a device for generating piecewise-affine multivariate functions, the device being characterized in that it has a dual-memory architecture to calculate piecewise-affine functions. It is immediately realized in an application specific integrated circuit, so that it exceeds by at least one order of magnitude the temporal and power performance of the existing solutions based on programmable logic. It is applicable in the field of Automatics and Control, since it is capable of implementing non-linear signal processing and/or controllers for any plant whose control surface can be defined using piecewise-affine functions. Its configurability and programmability make it possible to adapt the PWA function to the problem without the need to redesign the circuit.

Figure 3:
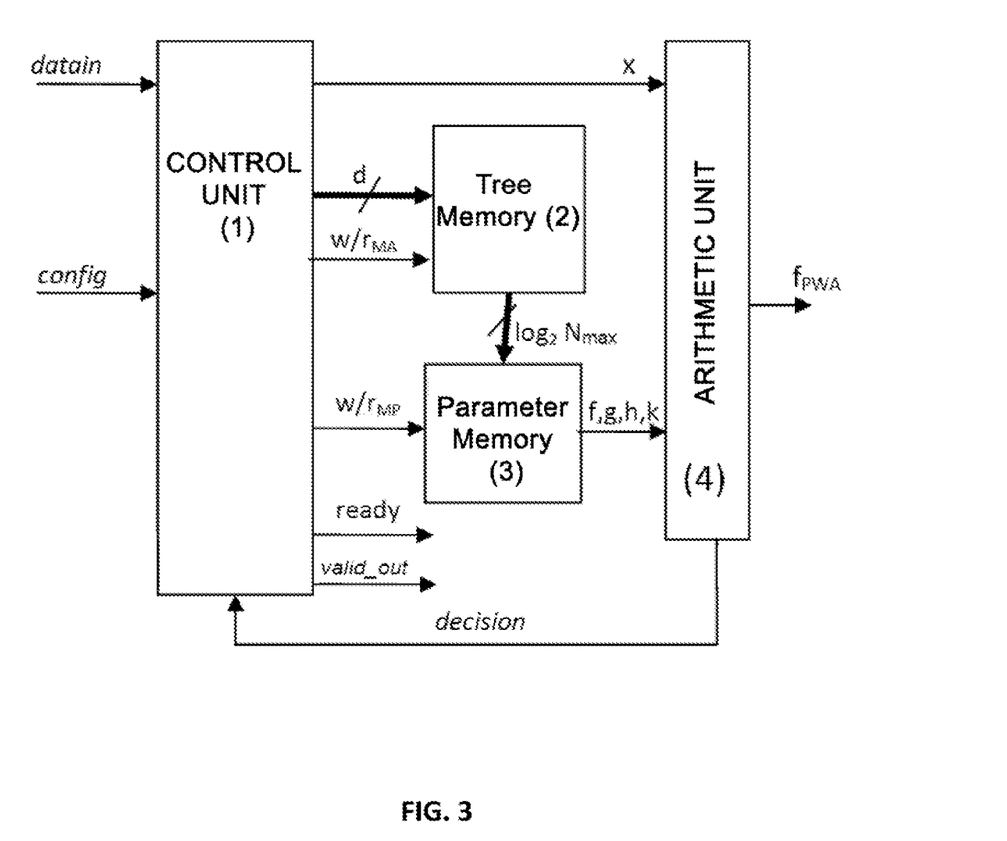
FIG. 3 shows the block diagram of the architecture of the invention.

The device of the invention comprises an architecture with four functional blocks namely: a control unit block (1), a tree memory block (2), a parameter memory block (3) and an arithmetic unit block (4) and it has at least three operating modes which can be selected using different values of the bus (config): writing of the tree memory (2), writing of the parameter memory (3) and evaluating the affine function. In a preferred embodiment it incorporates a fourth operating mode, which is the test mode. FIG. 3 shows the block diagram of the architecture of the device.

The control unit block (1) conducts the operation of the system in the four modes, controlling the acquisition of the data input to the circuit, generating the enable signals of the other blocks (writing or reading in the memories, through w/rMA and w/rMP signals), the data bus x to the arithmetic unit (4) and the correct output validation signal (valid_out).

The tree memory block (2) stores the binary search tree. In one embodiment of the invention the tree memory block uses a RAM memory. The user can redesign the tree by reprogramming the memory, allowing the computation of the PWA function online. This tree memory block (2) contains $2^{dmax}$ words, so that it is possible to program maximum depth trees $d_{max}$, wherein the number of possible states is $2^{dmax} - 1$. Of the $2^{dmax}$ words, $2^{dmax} - 1$ are the addresses of the parameter memory (3) and the length of each word is $\log_2(N_{max})$, $N_{max}$ being the maximum number of polytopes and hyperplanes that can be programmed to form a partition. The remaining word of the memory which does not store addresses of the parameter memory, is used to store the bits which configure the number of inputs and the depth of the tree of the specific application wherein the device of the invention is going to be used.

The parameter memory block (3) stores the parameters f, g, h and k necessary to compute the affine functions associated to the hyperplanes of the partition and to the polytopes. All the parameters required for the computation of an affine function or of a hyperplane must be stored in the same memory address, it being possible to achieve all the information with a single access. This block has as many words as maximum number $N_{max}$ of polytopes ($N_P$) plus hyperplanes ($N_E$) describe the PWA function. The length of each word of the parameter memory block (3) is the sum of the lengths of the parameters necessary to compute the affine expression, so that in a n-dimensional case with parameters of m, bits the word length is $m_1 + m_2 + \ldots + m_n + m_{n+1}$ bits.

The arithmetic unit block (4) performs the computation of the affine function such as that which appears in equation (1), through a set of multipliers and adders. This block can operate with a serial or parallel architecture.

The device proposed has at least three different operating modes, namely: the writing mode of the tree memory (2), the writing mode of the parameter memory (3) and the mode of evaluating the affine function.

In the writing mode of the tree memory (2) the control circuit of the device activates the specific data writing signals in the tree memory (2) enabling the writing of the states in said tree memory (2), the writing mechanism depending on the input signals of the memory and the timing of said writing depending on the type of memory used.

In the writing mode of the parameter memory (3) the control circuit activates the specific data writing signals in the parameter memory (3) enabling the writing of the parameters f, g, h and k corresponding to the partition and different affine functions of each polytope, the writing mechanism of the input signals depending on the parameter memory (3) and the timing of said writing depending on the type of memory used.

In the operating mode of evaluating the affine function the control circuit of the device activates the specific data reading signals in the tree memory block (2) and in the parameter memory block (3). The tree exploration is performed in order to locate the input value the reading mechanism depending on the input signals of the parameter memory (3) and the timing of said reading depending on the type of memory used. The control circuit determines, from the current state (for example $S[2^{d-2}]$, as is observed in the example of FIG. 2, the corresponding position in the tree memory block (2), which contains the address of the parameter memory (3) which stores the values (h, k) corresponding to the evaluation of that hyperplane. In turn, the arithmetic unit (4) performs the operation to evaluate if $h^T x+k<0$, so that the signal (decision) is made 1 and the control unit (1) selects one of the branches of the binary tree (leaf $S[2^{d-1}]$, in FIG. 2). If the evaluation is not correct, (decision) is made 0 and it selects the other branch of the binary tree (leaf $S[2^{d-1}+1]$ in the example of FIG. 2); the information on the next state reached is communicated to the control unit block (1) through this signal (decision); as the tree depth is known and programmable by the user, the control unit block (1) recognises when it has reached a leaf.

In a preferred embodiment it works with signed numbers, so that the sign can be directly used as the signal (decision) which controls through which of the trees it is necessary to continue the search.

In a preferred embodiment of the invention, the device permits an operating test mode. In this case the control unit block (1) of the device activates the signals necessary for storing the addresses and contents of the memories in a shift register, being extracted using a suitable protocol and allowing the correct functioning of the device or, in the event of failure, allowing it to detect which block or blocks cause the failure.

The device of the invention is in turn programmable and configurable. The configurability makes it possible to change the depth of the search tree and the number of inputs, being capable of working with different number of dimensions and memory sizes which determine the complexity and size of the binary search tree and numbers of parameters. The parallel or serial nature of the solutions depend on how the control unit (1) and the arithmetic unit (4) are implemented, any degree of parallelism being possible without modifying the architecture. The programmability allows, once the desired configuration has been selected, working with different PWA functions, reprogramming the contents of the memories. Therefore, a device incorporating this architecture can be used for different applications simply by reconfiguring and reprogramming it.

EXAMPLE 1

Figure 4:
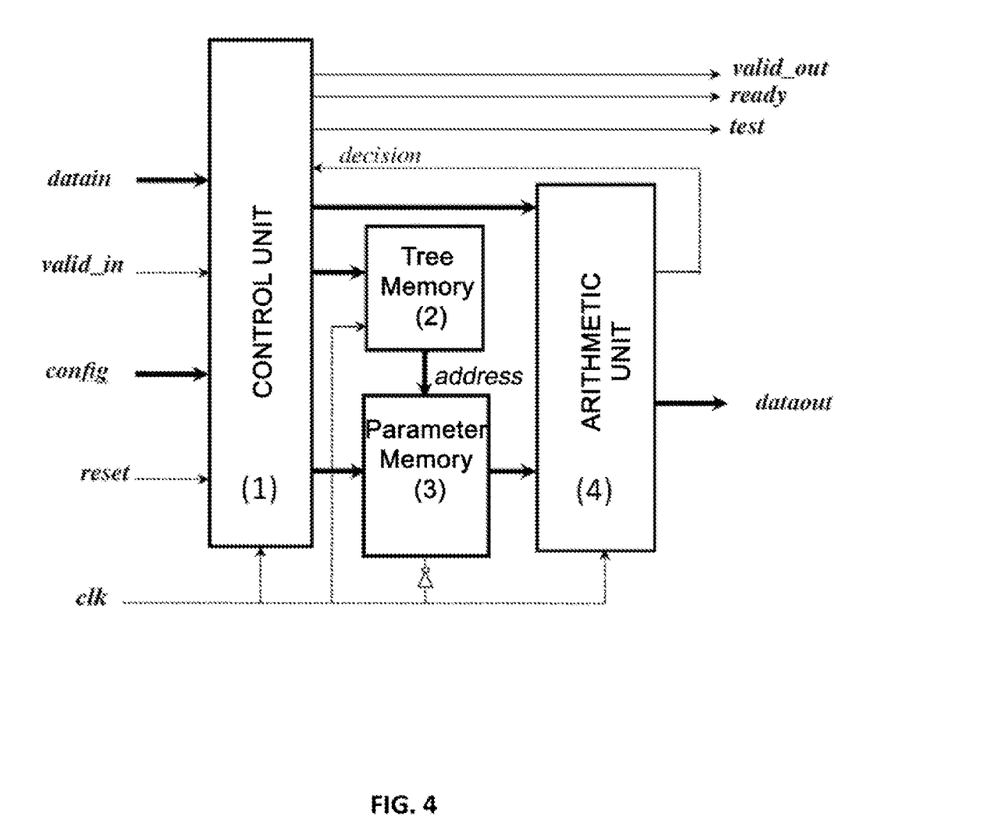
FIG. 4 shows the block-level diagram of the ASIC which has been designed as device test.

The architecture described in the present invention has been incorporated in an ASIC, with the aim of showing its characteristics and features. It is shown in FIG. 4. The implementation works with up to 4 dimensions, but it can be configured to work with 1, 2 and 3 dimensions and it uses a fixed-point arithmetic unit (4) with parallel architecture. The ASIC operates under the action of the signals (reset), (clk) and (datain). The signal (config) configures the blocks to fix four operating modes: evaluating the affine function, writing of the tree memory (2), writing of the parameter memory (3) and test mode. To write the memories, the control unit (1) selects the parameters of the memories which allow their writing, using an access protocol which uses the signals (reset), (clk) and (datain), being completed with the signal (ready), which enables an automatic writing process. In the test mode, the contents of the memories and sensitive information are temporarily stored in a log and serially extracted through the signal (test).

In the operating mode of evaluating the affine function, the control unit (1) enables the calculation of the affine functions, once the memories are correctly programmed. The signal (reset) is used to start the operation, (clk) it synchronizes the operations and (datain) represents the input signals bus (x) which is validated with the signal (ready). A local protocol is used to load the correct value of x for its computation, using the signal (valid in) to enable the introduction of new valid input data. After (reset) is made inactive, it acquires one of the n coordinates of the input point by the Control unit (1) in each active flank of (clk) and it is stored in a log in accordance with that local protocol. When all the coordinates have been read, the Control unit (1) addresses the Tree memory (2), which in turn addresses the Parameter memory (3), enabling the Arithmetic unit (4) to start to process the search point iteratively. The output datum is valid when the signal (valid_out) is activated. The time required to calculate the value of the function at a given point in the normal operating mode is TCLK (4+2d) wherein TCLK is the period of the signal (clk) and d is the depth that the user programs for the binary search tree ($d <= d_{max}$, $d_{max}$ being the maximum depth of the tree). Given the memory access protocol used, the reading process in both memories is performed in a single cycle, using the signal (clk) and its complement as control signals. The characteristics of the ASIC that has been used in this example of embodiment are the following:

Number of inputs: configurable from 1 to 4
Number of outputs: 1
Input resolution: 12 bits
Output resolution: 26 bits
Parameter resolution: 12 bits
Maximum number of hyperplanes plus polytopes: 4096
Depth of the binary tree: configurable from 1 to 13
Integrated in a 90 nm technology, 9 TSMC metals (Taiwan Semiconductor Manufacturing Company).

The invention claimed is:

1. Method for generating piecewise-affine multivariate functions, comprising:
an online computation of a search tree is performed in order to locate an input value in a plurality of polytopes of a partition, and a subsequent generation of a corresponding affine function; and wherein a piecewise-affine (PWA) function, $f_{PWA}: D \rightarrow R$, defined on a compact domain $D \subset R^n$, verifies that:

$$f_{PWA}(x) = f_i^T x + g_i, \; x \in \Omega_i \; i=1, \ldots, N_P$$

wherein $f_i \in R^n$, $g_i \in R$ and $\Omega_i$ are $N_P$ polytopes, which do not overlap and a joining thereof induces a polyhedral partition in a domain D;
wherein each polytope is a closed region delimited by hyperplanes ($h_j^T x + k_j = 0$, wherein $h_j \in R^n$, $k_j \in R$);
wherein throughout a plane it is possible to distinguish $N_E$ hyperplanes which delimit the polytopes,
wherein each hyperplane divides the domain in two parts, and the function $f_{PWA}$ is affine on each polytope, $\Omega_i$; so that a problem of locating a desired point has an objective of finding an index i so that $x \in \Omega_i$ to thus provide the affine function in that point;
wherein said method comprises the steps of:
forming a binary search tree from a single root, which is a first state (S[1]) which branches into two states, which are a second state (S[2]) and a third state (S[3]) which, in turn and successively, branch into two states, so that for a depth of a tree d, a number of states is $2^d-1$, the $2^{d-1}$ states of the deepest level being a leaves of the tree;

locating a polytope from the $\Omega_i$ polytopes containing an input vector by successively performing the comparisons ($h_j^T x + k_j < 0$);

performing the online search tree computation so that a vector x, the computation starts from the first state (S[1]) checking if $h_1^T x + k_1 < 0$: is correct, the computation selects a branch that leads to the second state (S[2]), if this is not correct, it selects the one that leads to the third state (S[3]), progressing in states until a state associated with the desired point is achieved; and implementing at least one of non-linear signal processing and controllers for a plant whose control surface is definable by the piecewise-affine multivariate functions.

2. A device for generating piecewise-affine multivariate functions for the implementation of the method of claim 1, comprising a circuit having an architecture with four functional blocks:

a control unit block,
a tree memory block,
a parameter memory block and
an arithmetic unit block;

which has at least three operating modes which can be selected using different values of a bus:

writing of the tree memory,
writing of the parameter memory and
evaluating the affine function; and which is characterized in that the control unit block conducts an operation of the system in all of the operating modes, which includes controlling an acquisition of data input to the circuit, generating a plurality of enable signals of the functional blocks;

wherein the tree memory block stores the binary search tree and a plurality of values which configure a number of inputs and the depth of the tree;

wherein the parameter memory block stores parameters f, g, h and k to compute a plurality of affine functions associated to the hyperplanes of the partition and to the polytopes, wherein the parameters for the computation of one of the affine functions or of one of the hyperplanes must be stored in a same memory address;

wherein the parameter memory block has as many words as maximum number $N_{max}$ of polytopes ($N_P$) plus hyperplanes ($N_E$) describe the PWA function; and wherein the arithmetic unit block performs the computation of the affine functions.

3. The device according to claim 2, wherein the length of each of the words of the parameter memory block is the sum of the lengths of the parameters necessary to compute the affine function, so that in a n-dimensional case with parameters of $m_i$ bits the word length is $m_1 + m_2 + \ldots + m_n + m_{n+1}$ bits.

4. The device according to claim 2, wherein the tree memory block uses a RAM memory, the tree is redesignable by reprogramming the RAM memory, allowing the computation of the PWA function online and wherein said memory block contains $2^{dmax}$ words, in the case of a maximum depth tree $d_{max}$, wherein the number of possible states is $2^{dmax}-1$, wherein of said $2^{dmax}$ words, $2^{dmax}-1$ are the addresses of the parameter memory and a length of each word is $\log_2(N_{max})$, $N_{max}$ being the maximum number of polytopes and hyperplanes forming the partition, and a remaining word stores the values which configure the number of inputs and the depth of the tree.

5. The device according to claim 2, wherein, after configuring a writing operating mode of the tree memory, a control circuit of the device activates a plurality of specific data writing signals in the tree memory enabling writing of the states in said tree memory, a writing mechanism of the input signals depending on the memory and a timing of said writing depending on a type of memory used.

6. The device according to claim 2, wherein, after configuring a writing mode of the parameter memory, a control circuit activates a plurality of specific data writing signals in the parameter memory enabling writing of the parameters f, g, h and k corresponding to the partition and different affine functions of each of the polytopes, a writing mechanism of the input signals depending on the parameter memory, and a timing of said writing depending on the type of memory used.

7. The device according to claim 2 further comprising a fourth operating mode following the operating test mode, wherein a control circuit activates a plurality of signals for storing a plurality of addresses and contents of the memories in a shift register, extracted using a suitable protocol and controlling functioning of the circuit in the event of failure by enabling detection of which block or blocks are causing the failure.

8. The device according to claim 2, wherein after evaluating the affine function, a control circuit activates a plurality of specific data reading signals in the tree memory block and in the parameter memory block, performing an exploration of the tree to locate the input value, a reading mechanism depending on the input signals and on the parameter memory and a timing of said reading depending on the type of memory used;

wherein the control circuit determines, from the current state, a corresponding position in the tree memory block, which contains the address of the parameter memory which stores the values (h, k) corresponding to the evaluation of that hyperplane;

the arithmetic unit performs the operation to evaluate if $h^T x + k < 0$, so that if the evaluation is correct, a decision signal is made 1 and the control unit selects the branch of the binary tree which is to its left in the immediately lower level, if the evaluation is not correct, the decision signal is made 0 and the control unit selects the branch of the binary tree to its right in the immediately lower level;

the information on the next state reached is communicated to the control unit block through the decision signal; and as the tree depth is known and programmable by the user, the control unit block recognises when it has reached a leaf.

9. A method for generating piecewise-affine multivariate functions, a piecewise-affine (PWA) function, $f_{PWA}: D \to R$, defined on a compact domain $D \subset R^n$, verifies that:

$$f_{PWA}(x) = f_i^T x + g_i, \ x \in \Omega_i, \ i = 1, \ldots, N_P$$

wherein:

$f_i \in R^n$, $g_i \in R$ and $\Omega_i$ are $N_P$ polyhedral regions, defining polytopes, which do not overlap and the joining thereof gives rise to D, each polytope is a closed region delimited by hyperplanes ($h_j^T x + k_j = 0$, wherein $h_j \in R^n$, $k_j \in R$), and throughout the domain it is possible to distinguish $N_E$ hyperplanes which delimit the polytopes, wherein each hyperplane divides the domain in two parts, and the function $f_{PWA}$ is affine on each polytope, $\Omega_i$;

being the method characterized by comprising, by means of a control unit block associated to:

a first memory block being a tree memory block, which comprises $2^{d_{max}}$ words, in the case of a maximum tree depth $d_{max}$, wherein the number of possible states is $2^{d_{max}}-1$, wherein of said $2^{d_{max}}$ words, $2^{d_{max}}-1$ are the addresses of the parameter memory and the length of each word is $\log_2(N_{max})$, $N_{max}$ being the maximum number of polytopes ($N_P$) and hyperplanes ($N_E$) forming the partition, and the remaining word stores the values which configure the number of inputs (n) and the depth of the tree, a second memory block being a parameter memory block, which comprises parameters f, g, h, k necessary to compute the affine functions associated to the hyperplanes of the partition and to the polytopes, being said parameters stored in a same memory address, so to achieve all the information with a single access, and as many words as maximum number $N_{max}$ of polytopes plus hyperplanes describe the PWA function, and an arithmetic unit block (4);

and which allows at least three operating modes which can be selected using different values of a bus: writing of the tree memory block, writing of the parameter memory block and evaluating the affine function;

so that changing the content of each memory block allows to generate a different function, the following steps:

locating a polytope $\Omega_i$ containing the input value (x) by an iterative evaluation of affine functions whose parameters ($h_j$, $k_j$) are real values and performing comparisons ($h^T_j x + k_j < 0$), computing the affine function associated to the polytope $\Omega_i$, $f(PWA) = f^T_i x + g_i$ wherein:

a binary search tree is formed from a single root, which is a first state S[1] which branches into two states, which are a second state S[2] and a third state S[3] which, in turn and successively, branch into two states, so that for a depth d of the tree, the number of states is $2^d - 1$, the $2^{d-1}$ states of the deepest level being the leaves of the tree;

given an input value (x) the method comprises:

reading a first word of tree memory block, corresponding to the first state S[1] so directs to a word of the parameter memory block storing parameters $h_1$, $k_1$, checking if $h^T_1 x + k_1 < 0$: if correct, the method comprises reading a second word of tree memory block corresponding to the second state S[2], if this is not correct, the method comprises reading a third word of tree memory block that leads to the third state S[3], and repeating the process until a leaf is reached, considering the leaf reached by using the tree depth stored in the tree memory block, directing to a word in the parameter memory block storing parameters f, g to generate an output $f_{PWA}(x) = f^T x + g$.

10. A device for generating piecewise-affine multivariate functions the device comprising a control unit block, associated to:

a first memory block, a second memory block, and an arithmetic unit block;

which allows at least three operating modes which can be selected using different values of a bus: writing of the tree memory, writing of the parameter memory and evaluating the affine function;

being the device characterized in that:

the control unit block being adapted to conduct operations in all operating modes, controlling the acquisition of the data input to the circuit, generating enable signals of the other blocks, the first memory block being a tree memory block storing:

the values which configure the number of inputs and the depth of the tree; and addresses of the second memory block, the second memory block (3) being a parameter memory block comprising:

as many words as a maximum number $N_{max}$ of polytopes ($N_P$) plus hyperplanes ($N_E$) describe the PWA function; and parameters f, g, h, k necessary to compute affine functions associated to hyperplanes of the partition and to the polytopes, used by the arithmetic unit block (4) to compute the affine function, and the arithmetic unit block being further adapted to compute the affine function associated to the polytopes ($N_P$) and the hyperplanes ($N_E$) of a polyhedral partition using the parameters stored in the same memory address, so that a single access is required.

11. The device according to claim 10, wherein the length of each word of the parameter memory block is the sum of the lengths of the parameters necessary to compute the affine expression, so that in a n-dimensional case with parameters of mi bits the word length is $m_1 + m_2 + \ldots + m_n + m_{n+1}$ bits.

12. The device according to claim 10, wherein, on configuring the writing operating mode of the tree memory, the control unit block of the device activates the specific data writing signals in the tree memory enabling the writing of the states in said tree memory, the writing mechanism of the input signals depending on the memory and the timing of said writing depending on the type of memory used.

13. The device according to claim 10, wherein, on configuring the writing mode of the parameter memory, the control unit block of the device activates the specific data writing signals in the parameter memory enabling the writing of the parameters f, g, h and k corresponding to the partition and different affine functions of each polytope, the writing mechanism of the input signals depending on the parameter memory, and the timing of said writing depending on the type of memory used.

14. The device according to claim 10, wherein the device allows a fourth operating mode, which is the test mode; so that on configuring the operating test mode, the control unit block activates the signals necessary for storing the addresses and contents of the memories in a shift register, being extracted using a suitable protocol and it allows the correct functioning of the circuit or in the event of failure it makes it possible to detect which block or blocks are causing the failure.

15. The device according to claim 10, wherein on configuring the operating mode of evaluating the affine function, the control unit block is adapted to activate specific data reading signals in the tree memory block and in the parameter memory block, performing the exploration of the tree in order to locate the input value, the reading mechanism depending on the input signals and on the parameter memory and the timing of said reading depending on the type of memory used; and to determine, from the current state the corresponding position in the tree memory block, which contains the address of the parameter memory which stores the values (h, k) corresponding to the evaluation of that hyperplane; and the arithmetic unit is adapted to evaluate if $h^T x + k < 0$, so that:

if the evaluation is correct; the signal defining a decision is made 1 and the control unit block selects a branch or leaf of the binary tree which is to its left in the immediately lower level, and if the evaluation is not correct, the decision is made 0 and a selection of the branch or leaf of the binary tree to its right in the immediately lower level is performed the information on the next state reached is communicated to the control unit block through this signal defining a decision; as the tree depth is known and programmable by the user, the control unit block recognizes when it has reached a leaf, considering the leaf reached by using the tree depth stored in the tree memory block.

\* \* \* \* \*